(12) United States Patent
Guo et al.

(10) Patent No.: US 12,337,396 B1
(45) Date of Patent: Jun. 24, 2025

(54) VIBRATION-DAMPING HYDRAULIC TOOL HOLDER BASED ON MULTI-CAVITY STRUCTURE

(71) Applicant: Shandong University, Jinan (CN)

(72) Inventors: Kai Guo, Jinan (CN); Jinlong Guo, Jinan (CN); Jie Sun, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/054,928

(22) Filed: Feb. 17, 2025

(30) Foreign Application Priority Data

Sep. 12, 2024 (CN) .......................... 202411276076.7

(51) Int. Cl.
*B23B 31/30* (2006.01)

(52) U.S. Cl.
CPC ........ *B23B 31/305* (2013.01); *B23B 2250/16* (2013.01); *B23C 2250/16* (2013.01); *Y10T 279/1241* (2015.01); *Y10T 408/76* (2015.01); *Y10T 409/304312* (2015.01)

(58) Field of Classification Search
CPC . B23B 31/305; B23B 31/302; B23B 31/1178; B23B 31/1176; B23B 27/002; B23B 2250/16; B23C 2250/16; Y10T 279/1216; Y10T 279/1241; Y10T 408/76; Y10T 409/304312
See application file for complete search history.

(56) References Cited

U.S. PATENT DOCUMENTS

| | | | | |
|---|---|---|---|---|
| 4,624,184 A | * | 11/1986 | Katz | ..................... B41F 27/105 279/2.08 |
| 2020/0346289 A1 | * | 11/2020 | Ziegltrum | ........... B23B 31/1178 |
| 2020/0406371 A1 | * | 12/2020 | Pankalla | ................ B23B 31/40 |
| 2024/0024961 A1 | * | 1/2024 | Boregowda | ........... B23B 31/305 |

FOREIGN PATENT DOCUMENTS

| | | |
|---|---|---|
| CN | 105689749 A | 6/2016 |
| CN | 206925610 U | 1/2018 |
| CN | 211623047 U | 10/2020 |
| WO | 2021253798 A1 | 12/2021 |

* cited by examiner

*Primary Examiner* — Sunil K Singh
*Assistant Examiner* — Eric Daniel Whitmire
(74) *Attorney, Agent, or Firm* — Bayramoglu Law Offices LLC

(57) ABSTRACT

A vibration-damping hydraulic tool holder based on a multi-cavity structure is provided. The vibration-damping hydraulic tool holder based on the multi-cavity structure includes a gripper, one end of the gripper is provided with an installation groove, the installation groove is filled with a sealing sleeve, the center of the sealing sleeve is provided with a clamping hole for clamping the tool, and several independent hydraulic units are set on the gripper to apply clamping force to the tool; the hydraulic unit consists of two hydraulic components, the two hydraulic components on the same hydraulic unit are set relatively and connected with each other, an oil injection hole is set on the gripper to add hydraulic oil to the hydraulic unit; The hydraulic tool holder based on multi-cavity structure vibration reduction can solve the problem of low surface quality caused by excessive vibration of the existing hydraulic tool holder.

3 Claims, 4 Drawing Sheets

VIBRATION-DAMPING HYDRAULIC TOOL HOLDER BASED ON MULTI-CAVITY STRUCTURE

CROSS REFERENCE TO THE RELATED APPLICATIONS

This application is based upon and claims priority to Chinese Patent Application No. 202411276076.7, filed on Sep. 12, 2024, the entire contents of which are incorporated herein by reference.

TECHNICAL FIELD

The invention relates to the technical field of machining tools, in particular to a vibration-damping hydraulic tool holder based on a multi-cavity structure.

BACKGROUND

As one of the key parts in the high-speed machining tool system, the hydraulic tool holder plays a very important role in the processing quality, stability, and safety of the product in high-speed machining.

The hydraulic tool holder is different from the conventional mechanical clamping structure, it uses the principle of static pressure expansion to clamp the tool, it is suitable for clamping drill bits, reamers, and milling cutters on machining centers, high-precision boring and milling machines, and flexible production lines. The hydraulic expansion tool gripper structure has an annular closed oil cavity between the gripper body and the clamping hole, the oil cavity is filled with special hydraulic oil, which can evenly transfer the hydraulic oil to each part of the closed oil cavity. When the inner hexagonal wrench is used to tighten the pressure bolt and increase the oil pressure in the oil cavity, each part of the closed oil cavity will be subjected to the same pressure, so that the inner wall of the oil cavity will expand and deform evenly and symmetrically to the axis direction. When the deformation is greater than the initial fit clearance, the tool will be clamped, and the gripper drives the tool to perform the high-speed cutting together. When the pressure bolt is loosened, the oil pressure in the oil cavity falls back, and the inner wall of the clamping hole returns to the original diameter under the action of the elastic recovery force to loosen the tool.

The hydraulic tool holders widely used in the market have obvious vibration during deep-hole machining, and the surface quality is low due to the excessive vibration of the tool.

SUMMARY

The purpose of the invention is to provide a vibration-damping hydraulic tool holder based on a multi-cavity structure to solve the problem of low surface quality caused by excessive vibration of the existing hydraulic tool holders.

In order to achieve the above purpose, the invention provides a vibration-damping hydraulic tool holder based on a multi-cavity structure, including a gripper, one end of the gripper is provided with an installation groove, the installation groove is filled with a sealing sleeve, a center of the sealing sleeve is provided with a clamping hole for clamping a tool, and several independent hydraulic units are set on the gripper to apply clamping force to the tool; the hydraulic unit consists of two hydraulic components, the two hydraulic components on the same hydraulic unit are set relatively, and the two hydraulic components are connected with each other, an oil injection hole is set on the gripper to add hydraulic oil to the hydraulic unit.

Preferably, the hydraulic unit includes the first hydraulic unit and the second hydraulic unit, the first hydraulic unit includes the first hydraulic component and the third hydraulic component, the second hydraulic unit includes the second hydraulic component and the fourth hydraulic component, the first hydraulic component, the second hydraulic component, the third hydraulic component and the fourth hydraulic component are arranged in turn on the gripper, the first hydraulic component, the second hydraulic component, the third hydraulic component and the fourth hydraulic component are distributed in a circular array on the gripper.

Preferably, the first hydraulic component includes a first oil groove and a first oil cavity, the first oil groove is located in a first groove set on an outer wall of the sealing sleeve, the first groove is set with a first convex block, the first convex block divides the first groove into two first oil grooves, a first oil channel is set between the first convex block and an inner wall of the installation groove, the two first oil grooves are connected by the first oil channel, the first oil cavity is set in the gripper, the first oil cavity is connected to the first oil channel, a throttle valve is arranged on a connecting oil circuit between the first oil cavity and the first oil channel.

Preferably, the third hydraulic component includes a third oil groove and a third oil cavity, the third oil groove is located in the third groove set on the outer wall of the sealing sleeve, the third groove is set with a third convex block, the third convex block divides the third groove into two third oil grooves, a third oil channel is set between the third convex block and the inner wall of the installation groove, the two third oil grooves are connected through the third oil channel, the third oil cavity is set in the gripper, and the third oil cavity is connected to the third oil channel, a throttle valve is arranged on a connecting oil circuit between the third oil cavity and the third oil channel.

Preferably, an inner side of the gripper is provided with a first oil hole, the two ends of the first oil hole are respectively connected with the first oil groove and the third oil groove, and the throttle valve is provided inside the first oil hole.

Preferably, the oil injection hole includes a first oil injection hole, and the first oil injection hole is connected to the first oil groove or the third oil groove.

Preferably, the second hydraulic component includes a second oil groove and a second oil cavity, the second oil groove is located in the second groove set on the outer wall of the sealing sleeve, the second groove is set with a second convex block, the second convex block divides the second groove into two second oil grooves, a second oil channel is set between the second convex block and the inner wall of the installation groove, the two second oil grooves are connected through the second oil channel, the second oil cavity is set in the gripper, and the second oil cavity is connected to the second oil channel, a throttle valve is arranged on the connecting oil circuit between the second oil cavity and the second oil channel.

Preferably, the fourth hydraulic component includes a fourth oil groove and a fourth oil cavity, the fourth oil groove is located in the fourth groove set on the outer wall of the sealing sleeve, and a fourth convex block is set in the fourth groove, the fourth convex block divides the fourth groove into two fourth oil grooves, a fourth oil channel between the fourth convex block and the inner wall of the installation groove, the two fourth oil grooves are connected through the fourth oil channel, the fourth oil cavity is set in the gripper, and the fourth oil cavity is connected to the fourth oil channel, a throttle valve is arranged on the connecting oil circuit between the fourth oil cavity and the fourth oil channel.

Preferably, an inner side of the gripper is provided with a second oil hole, two ends of the second oil hole are connected to the second oil groove and the fourth oil groove respectively, and a throttle valve is arranged inside the second oil hole.

Preferably, the oil injection hole includes a second oil injection hole, and the second oil injection hole is connected to the second oil groove or the fourth oil groove.

The advantages and positive effects of the hydraulic tool holder based on multi-cavity structure vibration-damping described in the invention are as follows:

1. The oil cavity is set in the gripper, and the oil cavity corresponds to the oil groove, the oil cavity is filled with hydraulic oil, which can effectively improve the vibration-damping effect in a specific frequency band and improve the stability of the tool holder.
2. Two hydraulic units are set inside the gripper, each hydraulic unit includes two hydraulic components, and the hydraulic components on the two hydraulic units are distributed at intervals, the hydraulic components between the same hydraulic unit are connected through the oil hole, and the throttle valve is set in the oil hole, when the tool is pressed, the damping is increased through the throttle valve, so as to improve the stability of the tool and maintain the clamping force of the tool, which is beneficial to reduce the problem of low surface quality caused by excessive vibration.

The following is a further detailed description of the technical scheme of the invention through drawings and an embodiment.

Figure 1:
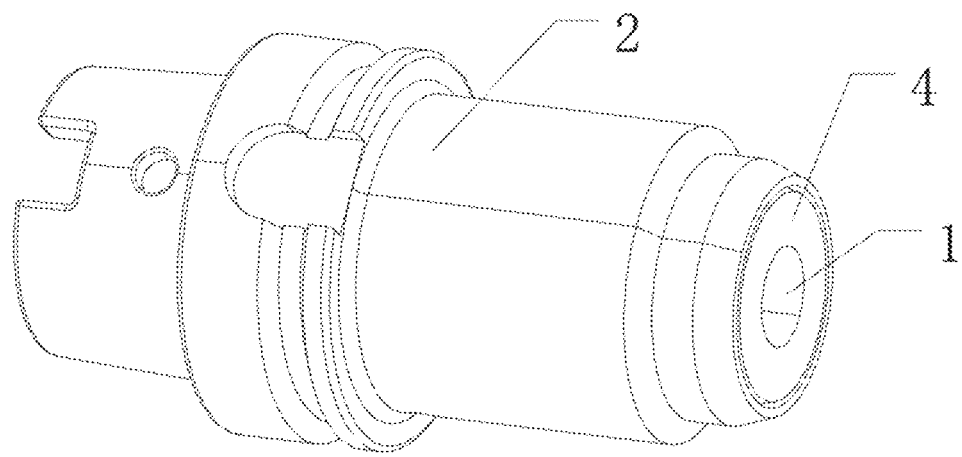
FIG. 1 is a structural diagram of the embodiment of the invention.
Figure 2:
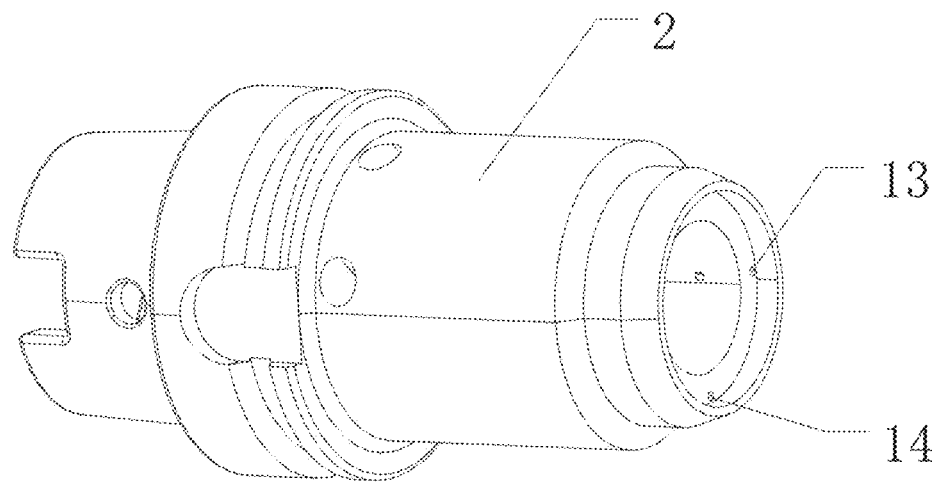
FIG. 2 is a structural diagram of the gripper of the embodiment of the invention.
Figure 3:
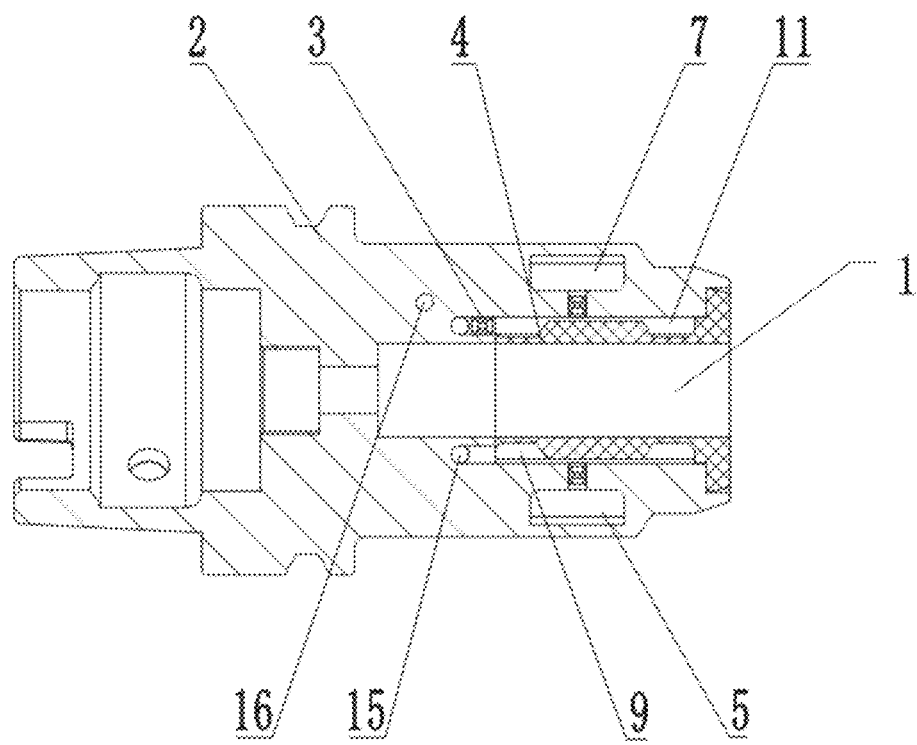
FIG. 3 is a structural diagram of the cross-section of the first hydraulic unit of the embodiment of the invention.
Figure 4:
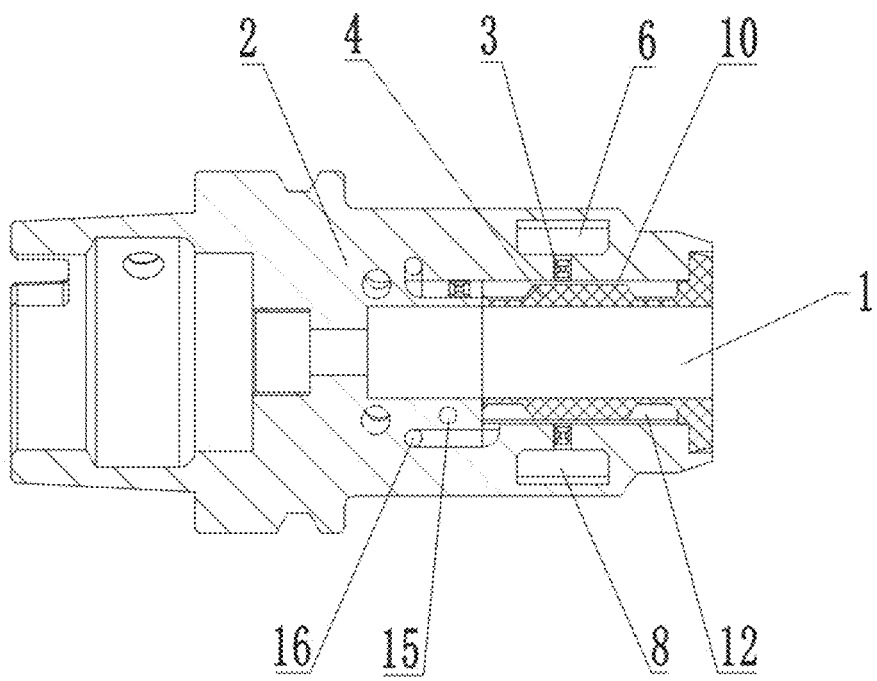
FIG. 4 is a structural diagram of the cross-section of the second hydraulic unit of the embodiment of the invention.
Figure 5:
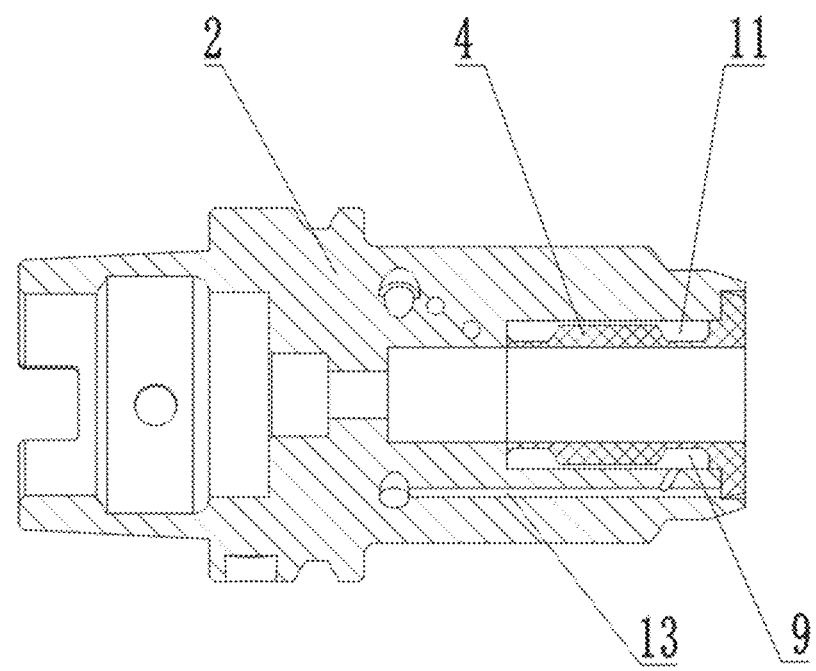
FIG. 5 is a structural diagram of the cross-section at the first oil injection hole of the embodiment of the invention.
Figure 6:
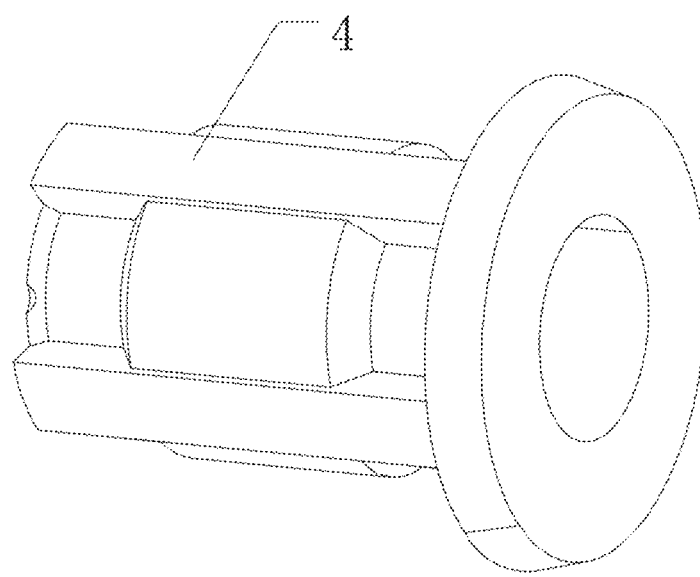
FIG. 6 is a structural diagram of the sealing sleeve of the embodiment of the invention.

MARKS IN THE FIGURES 1, clamping hole; 2, gripper; 3, throttle valve; 4, sealing sleeve; 5, the first oil cavity; 6, the second oil cavity; 7, the third oil cavity; 8, the fourth oil cavity; 9, the first oil groove; 10, the second oil groove; 11, the third oil groove; 12, the fourth oil groove; 13, the first oil injection hole; 14, the second oil injection hole; 15, the first oil hole; 16, the second oil hole.

DETAILED DESCRIPTION OF THE EMBODIMENTS

The following is a further explanation of the technical scheme of the invention through drawings and implementation examples.

Unless otherwise defined, the technical terms or scientific terms used in the invention should be understood by people with general skills in the field to which the invention belongs. The words first, second, and the like used in this invention do not represent any order, quantity, or importance, but are only used to distinguish different components. Similar words such as include or including mean that the elements or objects appearing before the word cover the elements or objects listed after the word and their equivalents, without excluding other elements or objects. Similar words such as connected or connecting are not limited to physical or mechanical connections, but can include electrical connections, whether direct or indirect. Up, down, left, right, etc. are only used to represent the relative positional relationship. When the absolute position of the described object changes, the relative positional relationship may also change accordingly.

Embodiment

As shown in FIG. 1, FIG. 2, FIG. 3, FIG. 4, FIG. 5, FIG. 6. A vibration-damping hydraulic tool holder based on a multi-cavity structure, including a gripper 2, which is obtained by 3D printing or manufactured by machining and welding. One end of the gripper 2 is provided with an installation groove, the installation groove is filled with an elastic sealing sleeve 4, and the sealing sleeve 4 is in a sealed connection with the installation groove. The two ends of the sealing sleeve 4 are in sealed and fixed connections with the two ends of the installation groove, thus forming a closed cavity between the sealing sleeve 4 and the installation groove. The center of the sealing sleeve 4 is provided with a clamping hole 1 for clamping the tool, and several independent hydraulic units are set on the gripper 2 to apply clamping force to the tool.

The hydraulic unit includes the first hydraulic unit and the second hydraulic unit, the first hydraulic unit includes the first hydraulic component and the third hydraulic component, and the second hydraulic unit includes the second hydraulic component and the fourth hydraulic component. The first hydraulic component, the second hydraulic component, the third hydraulic component, and the fourth hydraulic component are arranged in turn on the gripper 2, the first hydraulic component, the second hydraulic component, the third hydraulic component, and the fourth hydraulic component are distributed in a circular array on the gripper 2.

The first hydraulic component includes the first oil groove 9 and the first oil cavity 5, the first oil groove 9 is located in the first groove set on the outer wall of the sealing sleeve 4. The first groove is set with the first convex block, and the first convex block and the sealing sleeve 4 are integrated. The first convex block divides the first groove into two first oil grooves 9, the first oil channel is set between the first convex block and an inner wall of the installation groove, and the two first oil grooves 9 are connected by the first oil channel. The side wall of the sealing sleeve 4 is sealed with the side wall of the installation groove, so the first oil groove 9 is a closed structure. The first oil cavity 5 is set in the gripper 2, and the first oil cavity 5 is connected to the first oil channel. A throttle valve 3 is arranged on a connecting oil circuit between the first oil cavity 5 and the first oil channel.

The third hydraulic component includes the third oil groove 11 and the third oil cavity 7, the third oil groove 11 is located in the third groove set on the outer wall of the sealing sleeve 4. The third groove is set with the third convex block, and the third convex block and the sealing sleeve 4 are integrated. The third convex block divides the third groove into two third oil grooves 11, a third oil channel is set between the third convex block and the inner wall of the installation groove, and the two third oil grooves 11 are connected through the third oil channel, the third oil groove 11 is a closed structure, the third oil cavity 7 is set in the gripper 2, and the third oil cavity 7 is connected to the third oil channel. A throttle valve 3 is arranged on a connecting oil circuit between the third oil cavity 7 and the third oil channel.

Figure 7:
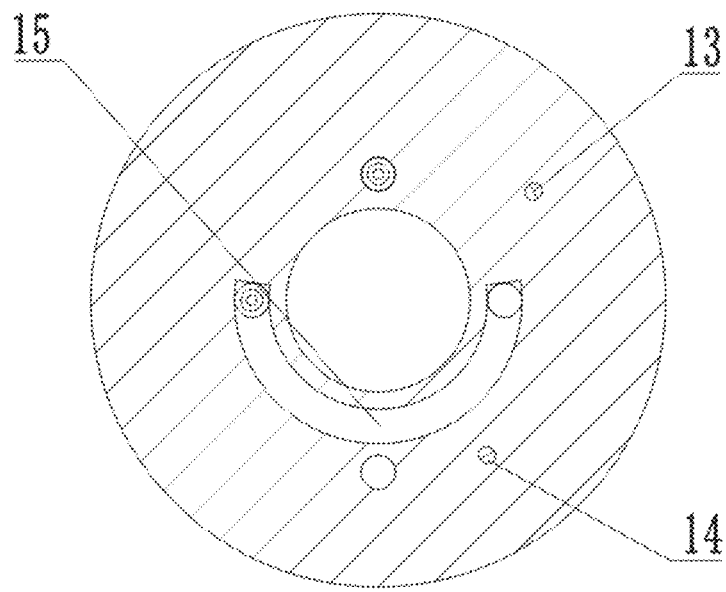
FIG. 7 is a structural diagram of the cross-section of the first oil hole of the embodiment of the invention.

As shown in FIG. 7. The first oil hole 15 is arranged in the interior of the gripper 2, and the first oil hole 15 is semi-circular. The two ends of the first oil hole 15 are respectively connected with the first oil groove 9 and the third oil groove 11, and a throttle valve 3 is arranged inside the first oil hole 15. The first oil groove 9 and the second oil groove 10 are connected through the first oil hole 15. The first oil injection hole 13 is set on the gripper 2, and the first oil injection hole 13 is connected with the first oil groove 9 or the third oil groove 11. In this embodiment, the first oil injection hole 13 is connected to the first oil groove 9, which is used to inject hydraulic oil into the first oil groove 9.

The second hydraulic component includes the second oil groove 10 and the second oil cavity 6, the second oil groove 10 is located in the second groove set on the outer wall of the sealing sleeve 4, and the second groove is set with a second convex block, the second convex block divides the second groove into two second oil grooves 10, the second oil channel is set between the second convex block and the inner wall of the installation groove, the two second oil grooves 10 are connected through the second oil channel. The second oil groove 10 is a closed structure. The second oil cavity 6 is set in the gripper 2, and the second oil cavity 6 is connected to the second oil channel. A throttle valve 3 is arranged on the connecting oil circuit between the second oil cavity 6 and the second oil channel.

The fourth hydraulic component includes the fourth oil groove 12 and the fourth oil cavity 8, the fourth oil groove 12 is located in the fourth groove set on the outer wall of the sealing sleeve 4, and the fourth convex block is set in the fourth groove, the fourth convex block divides the fourth groove into two fourth oil grooves 12, the fourth oil channel between the fourth convex block and the inner wall of the installation groove, the two fourth oil grooves 12 are connected through the fourth oil channel. The fourth oil groove 12 is a closed structure. The fourth oil cavity 8 is set in the gripper 2, and the fourth oil cavity 8 is connected to the fourth oil channel. A throttle valve 3 is arranged on the connecting oil circuit between the fourth oil cavity 8 and the fourth oil channel.

Figure 8:
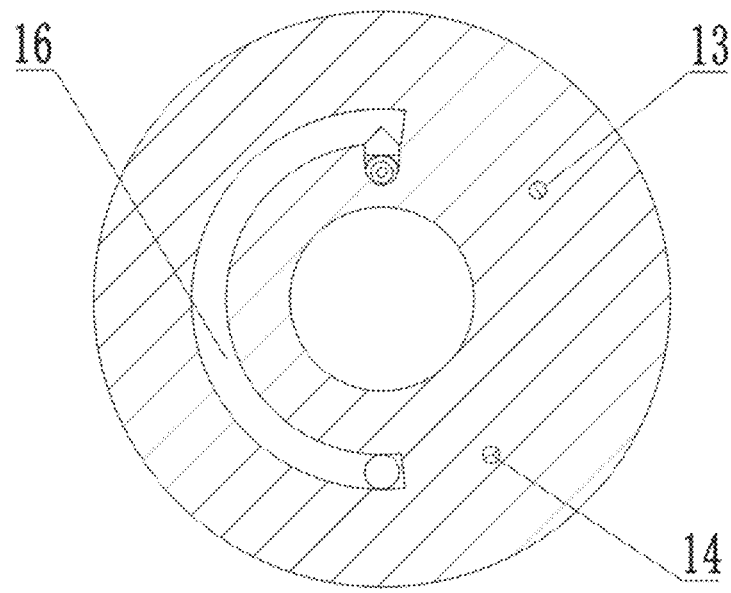
FIG. 8 is a structural diagram of the cross-section of the second oil hole of the embodiment of the invention.

As shown in FIG. 8. a semi-circular second oil hole 16 is set inside the gripper 2, the two ends of the second oil hole 16 are connected with the second oil groove 10 and the fourth oil groove 12 respectively, and the second oil groove 10 and the fourth oil groove 12 are connected through the second oil hole 16. The second oil hole 16 is equipped with a throttle valve 3. The second oil injection hole 14 is set in the gripper 2, and the second oil injection hole 14 is connected to the second oil groove 10 or the fourth oil groove 12. In this embodiment, the second oil injection hole 14 is connected to the fourth oil groove 12. The second oil hole 16 is misaligned with the first oil hole 15.

The throttle valves 3 are arranged at the connections of the first oil cavity 5 and the first oil cavity 9, the second oil cavity 6 and the second oil cavity 10, the third oil cavity 7 and the third oil cavity 11, the fourth oil cavity 8 and the fourth oil cavity 12, the first oil hole 15 and the second oil hole 16 are also provided with the throttle valves 3, which is convenient for the adjustment of hydraulic oil. The size and depth of the first oil cavity 5, the second oil cavity 6, the third oil cavity 7, and the fourth oil cavity 8 are set according to the working pressure of the tool holder, and hydraulic oil is filled. The first oil cavity 5, the second oil cavity 6, the third oil cavity 7, and the fourth oil cavity 8 can effectively improve the vibration-damping effect in a specific frequency band and improve the stability of the tool holder itself.

When used, the tool is clamped in the clamping hole 1, and the pressure bolts at the first oil injection hole 13 and the second oil injection hole 14 are tightened with a hexagonal wrench to increase the pressure of the hydraulic oil in the first oil injection hole 13 and the second oil injection hole 14. Under the action of the pressure, the hydraulic oil is injected into the first oil groove 9 through the first oil injection hole 13, and the hydraulic oil in the first oil groove 9 is injected into the third oil groove 11 through the first oil hole 15; the hydraulic oil is injected into the fourth oil groove 12 through the second oil injection hole 14, and the hydraulic oil in the fourth oil groove 12 is injected into the second oil groove 10 through the second oil hole 16. The inner walls of the first oil groove 9, the second oil groove 10, the third oil groove 11, and the fourth oil groove 12 are evenly and symmetrically expanded and deformed in the axial direction, thereby clamping the tool. When the cutting vibration of the tool is too large, the inner wall of the oil groove on one side is squeezed, on the one hand, the hydraulic oil in the oil groove enters the oil groove on the other side of the same hydraulic unit via the oil hole through the regulating valve, so as to adjust the hydraulic oil flow and change the damping, and improve the clamping effect on the tool. In addition, the hydraulic oil in the squeezed oil groove enters its corresponding oil cavity through the throttle valve 3, so that the oil pressure in the oil cavity changes, thereby reducing the propagation of vibration, so that the tool can maintain a stable clamping force during the machining process and improve the stability of the tool.

Therefore, the vibration-damping hydraulic tool holder based on a multi-cavity structure described in the invention can solve the problem of low surface quality caused by excessive vibration of the existing hydraulic tool holder.

Finally, it should be explained that the above embodiment is only used to explain the technical scheme of the invention rather than restrict it. Although the invention is described in detail concerning the better embodiment, the ordinary technical personnel in this field should understand that they can still modify or replace the technical scheme of the invention, and these modifications or equivalent substitutions cannot make the modified technical scheme out of the spirit and scope of the technical scheme of the invention.

What is claimed is:

1. A vibration-damping hydraulic tool holder based on a multi-cavity structure, comprising a gripper, wherein one end of the gripper is provided with an installation groove, the installation groove is filled with a sealing sleeve, a center of the sealing sleeve is provided with a clamping hole for clamping a tool, and a plurality of independent hydraulic units are set on the gripper to apply clamping force to the tool; the hydraulic unit consists of two hydraulic components, the two hydraulic components on the same hydraulic unit are set relatively, and the two hydraulic components are connected with each other, an oil injection hole is set on the gripper to add hydraulic oil to the hydraulic unit;

wherein the hydraulic unit comprises a first hydraulic unit and a second hydraulic unit, the first hydraulic unit comprises a first hydraulic component and a third hydraulic component, the second hydraulic unit comprises a second hydraulic component and a fourth hydraulic component, the first hydraulic component, the second hydraulic component, the third hydraulic component, and the fourth hydraulic component are arranged in turn on the gripper, the first hydraulic component, the second hydraulic component, the third hydraulic component, and the fourth hydraulic component are distributed in a circular array on the gripper;

the first hydraulic component comprises a first oil groove and a first oil cavity, the first oil groove is located in a first groove set on an outer wall of the sealing sleeve, the first groove is set with a first convex block, the first convex block divides the first groove into two first oil grooves, a first oil channel is set between the first convex block and an inner wall of the installation groove, the two first oil grooves are connected by the first oil channel, the first oil cavity is set in the gripper, the first oil cavity is connected to the first oil channel, a first throttle valve is arranged on a connecting oil circuit between the first oil cavity and the first oil channel;

the third hydraulic component comprises a third oil groove and a third oil cavity, the third oil groove is located in a third groove set on the outer wall of the sealing sleeve, the third groove is set with a third convex block, the third convex block divides the third groove into two third oil grooves, a third oil channel is set between the third convex block and the inner wall of the installation groove, the two third oil grooves are connected through the third oil channel, the third oil cavity is set in the gripper, and the third oil cavity is connected to the third oil channel, a second throttle valve is arranged on a connecting oil circuit between the third oil cavity and the third oil channel;

an inner side of the gripper is provided with a first oil hole, two ends of the first oil hole are respectively connected with the first oil groove and the third oil groove, and a third throttle valve is provided inside the first oil hole;

the second hydraulic component comprises a second oil groove and a second oil cavity, the second oil groove is located in a second groove set on the outer wall of the sealing sleeve, the second groove is set with a second convex block, the second convex block divides the second groove into two second oil grooves, a second oil channel is set between the second convex block and the inner wall of the installation groove, the two second oil grooves are connected through the second oil channel, the second oil cavity is set in the gripper, and the second oil cavity is connected to the second oil channel, a fourth throttle valve is arranged on a connecting oil circuit between the second oil cavity and the second oil channel;

the fourth hydraulic component comprises a fourth oil groove and a fourth oil cavity, the fourth oil groove is located in a fourth groove set on the outer wall of the sealing sleeve, and a fourth convex block is set in the fourth groove, the fourth convex block divides the fourth groove into two fourth oil grooves, a fourth oil channel between the fourth convex block and the inner wall of the installation groove, the two fourth oil grooves are connected through the fourth oil channel, the fourth oil cavity is set in the gripper, and the fourth oil cavity is connected to the fourth oil channel, a fifth throttle valve is arranged on a connecting oil circuit between the fourth oil cavity and the fourth oil channel;

the inner side of the gripper is further provided with a second oil hole, two ends of the second oil hole are connected to the second oil groove and the fourth oil groove respectively, and a sixth throttle valve is arranged inside the second oil hole;

wherein the first throttle valve, the second throttle valve, the third throttle valve, the fourth throttle valve, the fifth throttle valve, and the sixth throttle valve are I-shaped throttle valves.

2. The vibration-damping hydraulic tool holder based on the multi-cavity structure according to claim 1, wherein the oil injection hole comprises a first oil injection hole, and the first oil injection hole is connected to the first oil groove or the third oil groove.

3. The vibration-damping hydraulic tool holder based on the multi-cavity structure according to claim 1, wherein the oil injection hole comprises a second oil injection hole, and the second oil injection hole is connected to the second oil groove or the fourth oil groove.

* * * * *